United States Patent [19]
Gallucci et al.

[11] Patent Number: 4,873,286
[45] Date of Patent: Oct. 10, 1989

[54] MODIFIED POLYPHENYLENE ETHER-POLYAMIDE COMPOSITIONS AND PROCESS

[75] Inventors: Robert R. Gallucci, Pittsfield, Mass.; Roelof van der Meer, Bergen op Zoom, Netherlands; Roger W. Avakian, Brasschaat, Belgium

[73] Assignee: General Electric Company, Pittsfield, Mass.

[21] Appl. No.: 183,494

[22] Filed: Apr. 14, 1988

Related U.S. Application Data

[63] Continuation of Ser. No. 736,490, May 20, 1985, abandoned, which is a continuation-in-part of Ser. No. 612,389, May 21, 1984.

[51] Int. Cl.[4] .................... C08L 71/04; C08L 77/00
[52] U.S. Cl. ........................... 525/92; 525/133; 525/392; 525/397; 525/905
[58] Field of Search ................ 525/397, 92, 133

[56] References Cited

U.S. PATENT DOCUMENTS

| 3,356,761 | 12/1967 | Fox | 260/874 |
| 3,379,792 | 4/1968 | Finholt et al. | 525/905 |
| 3,700,630 | 10/1972 | Hamada et al. | 260/17.25 |
| 4,071,494 | 1/1978 | Gaylord | 523/205 |
| 4,315,086 | 2/1982 | Ueno et al. | 525/391 |
| 4,338,421 | 7/1982 | Maruyama et al. | 525/397 |
| 4,373,064 | 2/1988 | Bennett, Jr. et al. | 525/68 |
| 4,419,478 | 12/1983 | Brandstetter et al. | 525/905 |

FOREIGN PATENT DOCUMENTS

| 0046040 | 2/1982 | European Pat. Off. |
| 117250 | 7/1983 | Japan . |
| 59-66452 | 4/1984 | Japan . |

Primary Examiner—Lewis T. Jacobs
Assistant Examiner—A. Carrillo
Attorney, Agent, or Firm—Spencer D. Conard

[57] ABSTRACT

Novel modified polyphenylene ether-polyamide compositions comprising polyphenylene ether, polyamide and a polycarboxylic acid and the reaction product thereof and an improved process for preparing the same.

24 Claims, No Drawings

MODIFIED POLYPHENYLENE ETHER-POLYAMIDE COMPOSITIONS AND PROCESS

This is a continuation of application Ser. No. 736,490 filed May 20, 1985, now abandoned, which is a continuation-in-part of application Ser. No. 612,369 filed May 21, 1984.

The present invention relates to modified polyphenylene ether-polyamide compositions having improved chemical resistance, processability, elongation properties and/or impact strength as compared to unmodified compositions. More specifically, it relates to a resin composition which comprises a combination and/or the reaction product of (a) one or more polyphenylene ether resins, (b) one or more polyamide resins and (c) at least one aliphatic polycarboxylic acid or derivative modifier.

The invention also relates to an improved process for the manufacture of said modified polyphenylene ether-polyamide compositions wherein the improvement comprises precompounding the aliphatic polycarboxylic acid modifier with either the polyamide or, preferably, the polyphenylene ether prior to compounding with the other polymer. Such precompounding unexpectedly results in improved physical properties in the final composition over those prepared from the same ingredients without precompounding. Inasmuch as the compositions of the present invention may further comprise impact modifiers, reinforcing agents, stabilizers and the like, these may also be precompounded with either of the polymers for improved properties.

The polyphenylene ether resins are characterized by a unique combination of chemical, physical and electrical properties over a temperature range of more than 600° F., extending from a brittle point of about −275° F. to a heat distortion temperature of about 375° F. This combination of properties renders the polyphenylene ethers suitable for a broad range of applications. However, in spite of the aforementioned beneficial properties, the usefulness of the polyphenylene ether resins is limited as a consequence of their poor processability, impact resistance and chemical resistance.

Finholt (U.S. Pat. No. 3,379,792) discloses polymer blends wherein the processability of polyphenylene ether resins may be improved by blending therewith from 0.1 to 25% by weight of a polyamide. However, the advantages of the Finholt invention are limited by the fact that when the concentration of the polyamide exceeds 20% by weight, appreciable losses in other physical properties result. Specifically, there is no, or at best poor, compatibility between the polyphenylene ether and the polyamide such that phase separation of the resins occurs on molding or the molded article is inferior in mechanical properties.

Ueno et al. (U.S. Pat. No. 4,315,086) discloses polyphenylene ether blends having improved chemical resistance without a loss of other mechanical properties by blending therewith a polyamide and a specific compound selected from the group consisting essentially of (A) liquid diene polymers, (B) epoxy compounds and (C) compounds having in the molecule both of (i) an ethylenic carbon-carbon double bond or carbon-carbon triple bond and (ii) a carboxylic acid, acid anhydride, acid amide, imide, carboxylic acid ester, amino or hydroxyl group.

Finally, Kasahara et al. (EP46040) discloses the use of a copolymer comprising units of a vinyl aromatic compound and either an alpha, beta-unsaturated dicarboxylic acid anhydride or an imide compound thereof as a modifier to an impact resistant polyphenylene ether-polyamide blend for improved heat resistance and oil resistance.

Applicants have now discovered novel polyphenylene ether polyamide blends having improved impact strength, elongation, chemical resistance, processability and/or heat resistance as well as reduced water absorption as compared to unmodified polyphenylene ether-polyamide compositions. Specifically, applicants have discovered novel resin compositions having the aforementioned properties comprising a combination of and-/or the reaction product of a polyphenylene ether, a polyamide and a property improving amount of (a) an aliphatic polycarboxylic acid or derivative thereof represented by the formula:

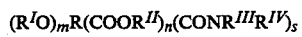

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl or carbonyl dioxy group of 1 to 10, preferably 1 to 4 carbon atoms, most preferably hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein $(OR^I)$ is alpha or beta to a carbonyl group and at least two carbonyl groups are separated by 2 to 6 carbon atoms. Further, these compositions may contain stabilizing and/or property improving amounts of primary or secondary amines. Optionally, the compositions of the present invention may further comprise fillers as well as other property enhancing additives such as polymeric impact modifiers and/or inorganic reinforcing additives and/or other polymers including alkenyl aromatic polymers such as the styrenic polymers.

Additionally, applicants have now discovered an improved process for the preparation of the said polyphenylene ether-polyamide blends. Specifically, while most any known process for the preparation of blend compositions, e.g., melt blending, may be employed in the preparation of the compositions of the present invention, applicants have surprisingly found further enhancement in impact strength, elongation, processability and the like by precompounding the aliphatic polycarboxylic acid modifier with either of the polyphenylene ether or polyamide resins prior to compounding with the other. Said precompounding steps may also be applied with respect to any additional additives employed in the preparation of the compositions.

Although the exact physical configuration of the compositions of the present invention is not known, it is generally believed that the compositions comprise a dispersion of one polymer in the other. Applicants believe the likely configuration is wherein the polyphenylene ether is dispersed in a polyamide matrix, however, the inverse may also be possible particularly where the polyamide is present in only a minor amount. Applicants also contemplate that there may be present in the products produced hereby some graft polyphenylene ether-polyamide products. Furthermore, applicants contemplate that grafting, if present, may be such that the polycarboxylic acid may, at least in part, promote grafting and/or act as a graft-linking agent itself. Thus, all such dispersions as well as graft, partially grafted and non-grafted products are within the full intended scope of the invention.

The polyphenylene ethers suitable for use in the practice of the present invention are well known in the art and may be prepared by any of a number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference. For brevity, the term "polyphenylene ether" as used throughout this specification and the appended claims will include not only unsubstituted polyphenylene ether (made from phenol) but also polyphenylene ethers substituted with various substituents. The term also includes polyphenylene ether copolymers, graft copolymers and block copolymers of alkenyl aromatic compounds, especially vinyl aromatic compounds, as disclosed below, and a polyphenylene ether.

Suitable phenol compounds for the preparation of the polyphenylene ethers may be represented by the general formula:

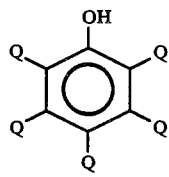

I wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6, 2,5, 2,4 and 3,5 dimethylphenols; 2-methyl-6-phenyl-phenol; 2,6-diphenyl-phenol; 2,6-diethylphenol; 2-methyl-6-ethylphenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinione.

Illustrative of suitable polyphenylene ethers there may be given, for example, poly(2,6dimethyl-1,4-phenylene)ether; poly(2-methyl-1,4-phenylene) ether, poly(3-methyl-1,4-phenylene)ether; poly(2,6-diethyl-1,4-phenylene)ether; poly(2-methyl-6-allyl-1,4-phenylene)ether; poly(2,6-dichloromethyl-1,4-phenylene)ether; poly(2,3,6-trimethyl-1,4-phenylene) ether; poly(2,3,5,6-tetramethyl phenylene)ether; poly(2,6-dichloro-1,4-phenylene)ether; poly(2,6-diphenyl-1,4-phenylene)ether; poly(2,5-dimethyl-1,4-phenylene)ether and the like. Further, as mentioned above, copolymers of the phenol compounds may also be used.

Preferred polyphenylene ethers will have the formula:

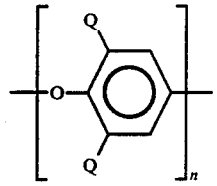

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene)ether; poly(2,6-diphenyl-1,4-phenylene)ether; poly(2,6-dimethyloxy-1,4-phenylene)ether; poly(2,6-diethoxy-1,4-phenylene)ether; poly(2-methoxy-6-ethyoxyphenylene)ether; poly(2-ethyl-6-stearyloxy-1,4-phenylene)ether; poly(2,6-dichloro-1,4-phenylene)ether; poly(2-methyl-6-phenyl-1,4-phenylene)ether poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene) ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2,6-dipropyl-1,4-phenylene)ether; poly(2-ethyl-6-propyl-1,4-phenylene)ether; and the like; most preferably poly(2,6-dimethyl-1,4-phenylene)ether.

One method for the production of the above polyphenylene ethers is by the oxidation of a phenol compound by oxgen or an oxygen-containing gas in the presence of a catalyst for oxidative coupling. There is no particular limitation as to the choice of catalysts and any catalysts for oxidation polymerization can be employed. As typical examples of the catalyst, there may be given a catalyst comprising a cuprous salt and a tertiary amine and/or secondary amine, such as cuprous chloride-trimethylamine and dibutylamine, cuprous acetate-triethylamine or cuprous chloride-pyridine; a catalyst comprising a curpic salt, a tertiary amine, and an alkali metal hydroxide, such as cupric chloride-pyridine-potassium hydroxide; a catalyst comprising a manganese salt and a primary amine, such as manganese chloride-ethanolamine or manganese acetate-ethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

Polyamides suitable for the preparation of the compositions of the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned -aminocaproic acid, butyrolactam, pivalolactam, caprolactam, capryl-lactam, enantholactam, undecanolactam, dodecanolactam and 3-and 4- aminobenzoic acids.

Diamine suitable for use in the preparation of the polyamides include the straight chain and branched, alkyl, aryl and alkyl-aryl diamines. Such diamines include, for example, those represented by the general formula:

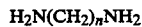

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylene diamine and the like.

The dicarboxylic acids may be aromatic, for example isophthalic and terephthalic acids. Preferred dicarboxylic acids are of the formula

HOOC—Y—COOH wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example polyamides 6, 6/6, 11, 12, 6/3, 6/4, 6/10 and 6/12 as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane. Mixtures and/or copolymers of two or more of the foregoing polyamides or prepolymers thereof, respectively, are also within the scope of the present invention. Preferred polyamides are the polyamides 6, 6/6, 11 and 12, most preferably polyamide 6/6.

It is also to be understood that the use of the term "polyamides" herein and in the appended claims is intended to include the toughened or super tough polyamides. Super tough polyamides, or super tough nylons, as they are more commonly known, are available commercially, e.g. from E. I. duPont under the tradename Zytel ST, or may be prepared in accordance with a number of U.S. Pat. Nos. including, among others, Epstein U.S. Pat. No. 4,174,358; Novak U.S. Pat. No. 4,474,927; Roura U.S. Pat. No. 4,346,194; and Joffrion U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. Pat. Nos. as well as in Caywood, Jr. U.S. Pat. No. 3,884,882 and Swiger U.S. Pat. No. 4,147,740 and Gallucci et al., "Preparation and Reactions of Epoxy-Modified Polyethylene", J. APPL. POLY. SCI., V. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The blending ratio of polyphenylene ether to polyamide is 5 to 95% by wt. preferably 30 to 70% by wt. of the former to 95 to 5% by wt., preferably 70 to 30% by wt. of the latter. When the polyamide is less than 5 wt. percent, its effect to improve solvent resistance is small, while when it exceeds 95 wt. percent, thermal properties such as heat distortion temperature tend to become poor.

Compounds useful for improving the physical properties of the polyphenylene ether-polyamide compositions are aliphatic polycarboxylic acids and derivatives thereof represented by the formula:

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

In general the polycarboxylic acid modifiers suitable for use herein encompass three classes, the polycarboxylic acids, the acid esters and the acid amides. Thus, when used herein and in the appended claims, it is to be understood that the term "polycarboxylic acid" refers to all these classes. Illustrative of suitable polycarboxylic acids there may be given citric acid, malic acid, and agaricic acid; including the various commercial forms thereof, such as, for example, the anhydrous and hydrated acids. Illustrative of acid esters useful herein include for example, acetyl citrate and mono- and/or distearyl citrates and the like. Suitable acid amides useful herein include for example N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Especially preferred derivatives are the salts thereof, including the salts with amines and/ preferably, the alkali and alkaline metal salts. Exemplary of suitable salts include calcium malate, calcium citrate, potassium malate and potassium citrate.

The amount of the polycarboxylic acid to be used is that amount which manifests property improvement, especially improved compatibility as well as improved processability, impact strength and/or elongation, in the polyphenylene ether-polyamide compositions. In general, the amount of polycarboxylic acid compounds used will be up to about 4%, preferably from about 0.05 to about 4%, most preferably from about 0.1 to about 2% by weight based on the total composition. Although higher amounts may be used, the preparation of such compositions causes significant problems in processing resulting in compositions having large die-swell and/or may not give optimum property improvement. The specific amount of the polycarboxylic acid compound to be used to achieve optimum results for a given composition is dependent, in part, on the specific polycarboxylic acid and polymers used, the weight ratio of said polymers and the processing conditions.

In addition to the improved processability impact strength and elongation, many of the compositions prepared in accordance with the present invention manifest improvements in other physical properties and characteristics including for example, reduced water absorption.

The above-mentioned property improving polycarboxylic acid compound may be used alone or in combination with a primary or secondary amine. The presence of the amine is found to enhance the improvement of certain physical properties, especially brightness, when used in combination with various polycarboxylic acids, especially for example with malic acid. Suitable amines include those primary and secondary amines having from 1 to about 20, preferably from 1 to about 10 carbon atoms. Illustrative of said suitable amines there may be given, methyl ethylamine, diethylamine, butylamine, dibutylamine, analine, n-octadecylamine and the like. The amount of the primary or secondary amine to be used is generally up to about 3% by wt., preferably from about 0.35 to about 1% by wt.

In the practice of the present invention, it may be further desirable to add an additional modifier resin or resin combination to further improve the physical properties, particularly the impact strength, and/or processability of the composition. Such modifier resins are well known in the art and are typically derived from one or more monomers selected from the group consisting of olefins, vinyl aromatic monomers, acrylic or alkyl acrylic acids and their ester derivatives as well as conjugated dienes. Especially preferred modifier resins are the rubbery high-molecular weight materials including natural and synthetic polymeric materials showing elasticity at room temperature. Suitable modifier resins include both homopolymers and copolymers, including random, block, radial block, graft and core-shell copolymers as well as combinations thereof.

Polyolefins or olefin-based copolymer employable in the practice of the present invention include, among others, low density polyethylene, high density polyethylene, linear low density polyethylene, isotactic polypropylene, poly(1-butene), poly(4-methyl-1-pentene), propylene-ethylene copolymers, and the like. Additional olefin copolymers include copolymers of one or more alpha olefins, particularly ethylene, with copolymerizeable monomers including for example vinyl acetate, acrylic acids and alkyl acrylic acids as well as the ester derivatives thereof including for example, ethylene acrylic acid, ethylacrylate, methacrylic acid, methyl methacrylate and the like. Finally, an additional class of olefin-based copolymers suitable for use herein include the ionomer resins, which may be wholly or partially neutralized with metal ions.

A second class of modifier resins employable herein are those derived from the vinyl aromatic monomers. These include, for example, modified and unmodified polystyrenes, ABS type graft copolymers; AB and ABA type block and radial block copolymers and vinyl aromatic conjugated diene core-shell graft copolymers. Modified and unmodified polystyrenes include homopolystyrenes and rubber modified polystyrenes, such as butadiene rubber modified polystyrene otherwise referred to as high impact polystyrene or HIPS. Additional useful polystyrenes include copolymers of styrene and various monomers, including for example, poly(styrene-acrylonitrile) (SAN), styrene-butadiene copolymers as well as the modified alpha and para substituted styrenes and any of the styrene resins disclosed in U.S. Pat. No. 3,383,435, herein incorporated by reference. ABS type of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenyl arene monomers and substituted derivatives thereof as well as acrylic monomers such as acrylonitriles and acrylic and alkyl acrylic acids and their esters.

An especially preferred class of vinyl aromatic monomer derived polymer resins are the block copolymers comprising monoalkenyl arene blocks and hydrogenated, partially hydrogenated and non-hydrogenated conjugated diene blocks and represented as AB and ABA block copolymers. Suitable AB type block copolymers are disclosed in for example U.S. Pat. Nos. 3,078,254; 3,402,159; 3,297,793; 3,265,765; and 3,594,452 and UK Patent No. 1,264,741, all herein incorporated by reference. Exemplary of typical species of AB block copolymers there may be given:

polystyrene-polybutadiene (SBR)
polystyrene-polyisoprene and
poly(alpha-methylstyrene)-polybutadiene.

Such AB block copolymers are available commercially from a number of sources including Phillips under the trademark Solprene.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Exemplary of typical species of triblock copolymers there may be given:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methystyrene).

A particularly preferred class of such triblock copolymers are available commercially as CARIFLEX®, KRATON D® and KRATON G® from Shell.

A third class of modifier resins suitable for use in the instant invention are those derived from conjugated dienes. While many copolymers containing conjugated dienes have been discussed above, additional conjugated diene modifier resins include for example homopolymers and copolymers of one or more conjugated dienes including for example polybutadiene, butadiene-styrene copolymers, isoprene-isobutylene copolymers, chlorobutadiene polymers, butadiene-acrylonitrile copolymers, polyisoprene, and the like. Finally, ethylene-propylene-diene monomer rubbers are also intended to be within the full scope of the present invention. These EPDMs are typified as comprising prodominately ethylene units, a moderate amount of propylene units and only a minor amount, up to about 20mole % of diene monomer units. Many such EPDM's and processes for the production thereof are disclosed in U.S. Pat. Nos. 2,933,480; 3,000,866; 3,407,158; 3,093,621 and 3,379,701, herein incorporated by reference.

An additional group of modifier resins employable in the instant invention are the core-shell type graft copolymers. In general, these are characterized as having a predominately conjugated diene rubbery core or a predominately cross-linked acrylate rubbery core and one or more shells polymerized thereon and derived from monoalkenyl arene and/or acrylic monomers alone or, preferably, in combination with other vinyl monomers. Such core-shell copolymers are widely available commercially, for example, from Rohm and Haas Company under the tradenames KM-611, KM-653 and KM-330, and are described in U.S. Pat. Nos. 3,808,180; 4,034,013; 4,096,202; 4,180,494 and 4,292,233.

Also within the scope of the present invention are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

It is also to be understood that in addition to the straight polymers and copolymers described above, there may be employed such polymers and copolymers having copolymerized therewith or grafted thereon monomers having functional groups and/or polar or active groups. Such functionalized or activated polymers and copolymers are described in the above-mentioned Epstein, Novak, Roura, Joffrion, Caywood, Swiger and Gallucci references cited above with respect to the discussion on toughened polyamides. All of such functionalized or activated polymers and copolymers may be directly blended with the ingredients to the present compositions or, as described above, may be precompounded with a polyamide or polyphenylene ether. Finally, other suitable modifier resins and high molecular weight rubbery materials which may be employed in the practice of the present invention include for example thiokol rubber, polysulfide rubber, polyurethane rubber, polyether rubber (e.g. polypropylene oxide), epichlorhydric rubber, ethylene propylene rubber, thermoplastic polyester elastomers, thermoplastic ether-ester elastomers and the like.

The amount of the rubbery polymer used will be up to about 100 parts by weight, preferably from about 5 to about 50 parts by weight based on 100 parts by weight of a mixture of polyphenylene ether and polyamide. However, when the amount is less than 2 parts by weight, the effect of the rubbery polymer to improve impact resistance is poor. When the amount is more than 100 parts by weight, the impact resistance is much improved, however, some loss of other physical properties may result. Thus, in the interest of balancing impact resistance and other physical properties, it is preferred to use less than 100 parts by weight of the rubbery polymer. It is also to be understood that combinations of the above-mentioned modifier resins may be employed and are within the full intended scope of the present invention.

Finally, in addition to the foregoing, the polyphenylene ether-polyamide resin compositions of the present invention may further comprise other reinforcing additives, including glass fibers, carbon fibers, mineral fillers and the like as well as various flame retardants, colorants, stabilizers and the like known to those skilled in the art.

When employed in the practice of the present invention, reinforcing additives should be used in an amount up to no more than about 50 wt. % based on the total composition, preferably no more than about 30 wt. %. Especially preferred reinforcing additives are the filamentous and chopped glass fibers. Such glass fibers may be untreated or, preferably, treated with a silane or titanate coupling agent, and are well known in the art and widely available from a number of manufacturers.

Suitable stabilizers for use in the practice of the present invention generally include most any of the known thermal and oxidative stabilizers suitable for use with either polyamides or polyphenylene ethers. Especially preferred are those stabilizers suitable for use with polyamides. For example, liquid phosphates and hindered phenols may be employed as well as stabilizer packages encompassing combinations of hindered phenols and potassium and cuprous salts.

The method for producing the resin compositions of the present invention is not particularly limited, and the conventional methods are satisfactorily employed. Generally, however, melt blending methods are desirable. The time and temperature required for melt-blending are not particularly limited, and they can properly be determined according to the composition of the material. The temperature varies somewhat with the blending ratio of the polyphenylene ether to polyamide, but it is generally within a range of 270° to 350° C. A prolonged time and/or a high shear rate is desirable for mixing, but the deterioration of the resin composition advances. Consequently, the time needs to be determined taking into account these points.

Any of the melt-blending methods may be used, if it can handle a molten viscous mass. The method may be applied in either a batchwise form or a continuous form. Specifically, extruders, Bambury mixers, rollers, kneaders and the like may be exemplified.

While all ingredients may be initially and directly added to the processing system, applicants have surprisingly found that the physical properties of the composition, particularly impact strength and elongation, are greatly enhanced by initially precompounding one of the polymer resins, preferably the polyphenylene ether, with the polycarboxylic acid prior to blending with the other polymer. Such precompounding may be done in two steps wherein the polycarboxylic acid and the polyphenylene ether are melt extruded to form pellets which are then blended through extrusion with the polyamide or one can employ an extrusion apparatus or melt blending apparatus wherein the polyphenylene ether and polycarboxylic acid are fed at the throat of the screw and the polyamide is subsequently added to the extrusion system in a downstream feed port. In this latter method, the polycarboxylic acid and polyphenylene ether are melt blended and in a molten state when the polyamide is added.

With respect to the other ingredients of the compositions, all ingredients may be directly added to the processing system or certain additives may be precompounded with each other or either polymer product blending with the other polymer. For example, as discussed above, impact modifier or toughening agents may be precompounded with a polyamide to form a super tough polyamide. Alternatively, the polyphenylene ether may be precompounded with the rubber polymer or other additional resin and the polycarboxylic acid and subsequently compounded with the polyamide. Furthermore, the amine compound, if used, may be premixed and/or reacted with a polycarboxylic acid and precompounded with a polyphenylene ether prior to compounding with a polyamide. In essence, any system of precompounding may be employed in the practice of the present invention; however, the tremendous and unexpected improvement and physical properties is most apparent when at a minimum the polycarboxylic acid is precompounded with the polyphenylene ether. While the polycarboxylic acid may be precompounded with a polyamide, the enhancement and physical properties is not as great.

The following examples are presented in order that those skilled in the art may better understand how to practice the present invention. These examples are merely presented by way of illustration and are not intended to limit the invention thereto. Unless otherwise stated, all formulations are expressed in terms of parts by weight.

EXAMPLES 1 and 2

A series of polyphenylene ether-polyamide compositions within and outside of the scope of the present invention were prepared. All compositions were prepared on a single screw extruder by direct addition of ingredients and extruded at 300° C. The specific composition and the physical properties thereof are shown in Table 1

TABLE 1

| Example | A | 1 | 2 |
|---|---|---|---|
| polyphenylene ether[a] | 70 | 70 | 70 |
| polyamide 6,6[b] | 30 | 30 | 30 |
| citric acid (anhydrous) | — | 1.0 | — |
| malic acid | — | — | 1.0 |
| Unnotched Izod (ft.-lbs./in.) | 2.8 | 16.7 | 8.5 |

[a]poly(2,6-dimethyl-1,4-phenylene)ether produced by General Electric Company
[b]polyamide 6,6 from duPont As seen from example 1 and 2 and comparative example A, the addition of the polycarboxylic acid to the polyphenylene ether-polyamide composition greatly improved the physical properties of such blends as demonstrated by the higher impact strength. Additionally, the compositions were found to have good compatibility as parts molded from these compositions were devoid of streaks and or delamination which are often associated with incompatibility. The compositions within the scope of the invention were also found to have improved elongation, processability and chemical resistance.

EXAMPLES 3–6

A second series of examples were prepared demonstrating the applicability of the present invention to rubber modified polyphenylene ether-polyamide blends. These examples were prepared on a twin screw extruder at about 575° F. The specific compositions of these examples as well as the physical properties thereof were as shown in Table 2.

TABLE 2

|  | B | 3 | 4 | 5 | 6 |
|---|---|---|---|---|---|
| polyphenylene ether[a] | 49 | 49 | 49 | 49 | 49 |
| polyamide 6,6[b] | 41 | 41 | 41 | 41 | 41 |
| citric acid (anhydrous) | — | 0.1 | 0.25 | 0.5 | — |
| malic acid | — | — | — | — | 0.25 |
| SEBS[c] | 10 | 10 | 10 | 10 | 10 |
| Gardner Impact (in.-lbs.) | 18 | >320 | >320 | 184 | >320 |
| Notched Izod (ft.-lb./in.) | 0.8 | 3.0 | 2.6 | 1.5 | 2.4 |
| % Tensile elongation | 8 | 25 | 33 | 15 | 31 |

[a]poly(2,6-dimethyl-1,4-phenylene)ether from General Electric Company
[b]polyamide 6,6 from duPont
[c]Styrene hydrogenated polybutadiene styrene triblock copolymer from Shell The results shown in Table 2 clearly demonstrate the benefit and effectiveness of the polycarboxylic acid in the rubber modified polyphenylene ether-polyamide blends. Additionally, parts prepared from the composition within the scope of the present invention were free of streaks and/or delamination.

EXAMPLE 7

Two blends of 70% by wt. polyphenylene ether and 30% polyamide 6 were prepared, one with 0.5 phr citric acid and the other without any polycarboxylic acid modifier/compatibilizer. The unnotched izod impact strengths of the latter was only 2.6 ft.-lbs./in. whereas the unnotched izod impact strength of the composition according to the invention increased to 3.2 ft.-lbs./in. This composition also demonstrated improvement of other physical properties including for example tensile elongation.

EXAMPLES 8–10

A series of polyphenylene ether-polyamide compositions within and outside of the scope of the present invention were prepared. All compositions were prepared on a twin screw extruder by direct addition of ingredients and extruded at approximately 285° C. under vacuum at a screw speed of 250 rpm. The specific compositions the physical properties thereof are shown in Table 3.

TABLE 3

| Example | C | 8 | 9 | 10 |
|---|---|---|---|---|
| polyphenylene ether[a] | 50 | 50 | 50 | 50 |
| polyamide 6,6[b] | — | — | 50 | — |
| polyamide 6,6[c] | 50 | 50 | — | — |
| polyamide 6,6[d] | — | — | — | 50 |
| citric acid (anhydrous) | — | 1 | 1 | 1 |
| Notched Izod (ft.lb./in.) | .5 | 1.0 | 1.1 | 1.0 |
| Unnotched Izod (ft.lb./in.) | 10* | >11.7 | >11.7 | >11.7 |
| Tensile Yield Strength (psi) × 10³ | 10.8 | 11.0 | 11.2 | 11.0 |

TABLE 3-continued

| Example | C | 8 | 9 | 10 |
|---|---|---|---|---|
| Tensile Elongation (%) | 7 | 24 | 31.5 | 21 |

[a]polyphenylene ether from General Electric Company
[b&c]Fabenyl 45 APBH and R600, respectively from Tubize Polymers SA, Belgium.
[d]polyamide 6,6 from du Pont
*one out of six bars shows a value >11.7

These examples demonstrate the improved physical properties associated with the use of citric acid in polyphenylene ether-polyamide blends. Specifically, these compositions demonstrated improved compatibility, notched and unnotched izod impact strength, tensile yield strength and elongation as compared to the unmodified composition.

EXAMPLES 11-17

Several compositions were prepared on a twin screw extruder at 285° C. with a screw speed of 300 rpm above. These compositions further demonstrate the applicability of the invention to rubber modified as well as stabilized and pigmented compositions, at various levels of the polycarboxylic acid additive. The compositions and properties thereof are shown in Table 4. All amounts are in parts by weight.

Once again these examples demonstrate the excellent properties obtained by the compositions of the present invention. As seen in examples 13 and 14, the loss of impact strength by incorporating the stabilizer additive can be overcome by increasing the amount of polycarboxylic acid. The same is also true for compositions incorporating therein TiO2 pigment. In general, these compositions had improved physical properties as well as compatibility as evidenced by the lack of streaks and/or delamination in molded parts.

EXAMPLES 18-21

Compositions in accordance with the present invention were prepared on a twin screw extruder at 295° C. and screw speed 250 rpm. These compositions further comprised an amine compound with and without a phosphite stabilizer. The compositions and the properties thereof are shown in Table 5.

As these examples demonstrate, excellent physical properties are attained by these compositions.

TABLE 5

| Example | E | 18 | 19 | 20 | 21 |
|---|---|---|---|---|---|
| polyphenylene ether[a] | 50 | 50 | 50 | 50 | 50 |
| polyamide 6,6[b] | 50 | 50 | 50 | 50 | 50 |
| citric acid-1-hydrate |  | 0.7 | 0.7 | 0.7 | 0.7 |
| phosphite stabilizer |  | — | 0.35 | — | — |
| dibutylamine |  | — | 0.35 | 0.35 | 0.7 |
| Notched Izod ft.lb/in. | 0.69 | 1.23 | 1.0 | 1.2 | 1.0 |
| Unnotched Izod ft.lb./in.* |  | 11.7(3) | 9.7(0) | 7.0(1) | 11.6(0) |
| Tensile Yield strength ($\times 10^3$ psi) | 7.8 | 10.9 | 10.2 | 10.8 | 10.1 |
| Elongation % | 5.5 | 19.7 | 10.7 | 14.7 | 20.8 |

[a]polyphenylene ether from General Electric Company
[b]Fabenyl 45APBH from Tubize Polymers S.A. Belgium.
*Number in parenthesis represents the number of non-broken bars out of six tested that did not break at 11.7 ft.lbs.

EXAMPLE 22

Two examples of polyphenylene ether-polyamide compositions within and outside the scope of the present invention were prepared on a twin screw extruder at 285° C. and screw speed of 200 rpm. The specific compositions and physical properties thereof are shown in Table 6.

These examples further demonstrate the applicability of the present invention to other polycarboxylic acids, specifically malic acid.

TABLE 6

| Example | F | 22 |
|---|---|---|
| polyphenylene ether[a] | 50 | 50 |
| polyamide 6,6[b] | 50 | 50 |
| malic acid |  | 1 |
| Notched Izod ft.lb/in. | .69 | .71 |
| Tensile Yield Strength $\times 10^3$ psi | 7.8 | 8.2 |
| Tensile Elongation (%) | 5.5 | 6.5 |

[a&b]see footnotes Table 3.

EXAMPLES 23-25

Several additional examples were prepared demonstrating various other polycarboxylic acid modifiers employable in the practice of the instant invention. The

TABLE 4

| Example | D | 11 | 12 | 13 | 14 | 15 | 16 | 17 |
|---|---|---|---|---|---|---|---|---|
| polyphenylene ether[a] | 45 | 45 | 45 | 45 | 45 | 45 | 45 | 45 |
| polyamide 6,6[b] | 45 | 45 | 45 | 45 | 45 | 45 | 45 | 45 |
| citric acid-1-hydrate |  | 0.35 | 0.7 | 0.35 | 0.7 | 0.35 | 0.7 | 0.35 |
| phosphite stabilizer |  |  |  | 1 | 1 |  |  | 1 |
| TiO2 |  |  |  |  | 5 | 5 | 5 |  |
| SBS[c] | 10 | 10 | 10 | 10 | 10 | 10 | 10 | 10 |
| Unnotched Izod (ft.lb./in.) |  | 5.3(4) | 6.0(5) | 2.4(0) | 4.3(3) | 3.6(0) | 4.7(2) | 1.9(0) |
| Falling Dart Impact (ft.lb.) | 14 | 162(4) | >162(4) | 49(0) | 146(2) | 84(0) | 213(2) | 30(0) |
| Tensile Yield Strength (psi $\times 10^3$) | 7.5 | 8.4 | 8.5 | 8.7 | 8.4 | 8.5 | 8.6 | 8.5 |
| Tensile Elongation (%) | 9.2 | 49.7 | 57.1 | 17.3 | 45.9 | 30.1 | 40.7 | 12.2 |

[a]poly(2,6 dimethyl-1,4-phenylene)ether from General Electric Company
[b]Fabenyl 45 APBH, water content 0.3–0.4.
[c]styrene-butadiene-styrene triblock copolymer, Cariflex/KRATON D from Shell
*Numbers in parenthesis represent the number of test parts out of five tested that did not break at 162 ft.lbs.

mono-stearyl citrate employed is from Pfiezer Chemicals and actually comprises a 22/78 mixture of the mono- and di- stearyl esters of citric acid. Acetyl citric acid was prepared inhouse by allowing acetyl chloride to react with the hydroxy group of the citric acid. The carboxylic acid salt, calcium malate, was obtained from Pfaltz-Bauer. The results obtained with these polycarboxylic acids and derivatives were as shown in Table 7.

TABLE 7

| Example | G | 23 | 24 | 25 |
|---|---|---|---|---|
| polyphenylene ether[a] | 70 | 70 | 70 | 70 |
| polyamide 6,6[b] | 30 | 30 | 30 | 30 |
| Monostearyl citrate | — | 1.12 | — | — |
| Acetyl citric acid | — | — | 0.5 | — |
| Calcium Malate | — | — | — | 0.5 |
| Unnotched Izod ft.lb/in. | 2.8 | 4.1 | 6.9 | 6.9 |

[a&b]see footnotes Table 3.

EXAMPLES 26–32

An additional series of examples were prepared, this time demonstrating the utility of various acid-amides, in the present invention. The acid-amides were prepared by dissolving the respect acid in tetrahydrofuran (THF) and then adding in a drop wise fashion the amine while constantly stirring. Depending upon the amine employed, the formed acid-amides precipitated out or formed a highly viscous solution. In the former case, the precipitate was filtered, washed with clear THF and dried in a vacuum-oven. In the latter case, THF was removed by rotary-evaporation and the remaining paste dried in a vacuum-oven and the product crystallized.

The specific reactants and ratios thereof employed and the products obtained were as shown in Table 8.

These acid-amides were then used, on an equimolar basis, except in the case of the malic acid based examples, in accordance with the present invention to demonstrate their effectiveness as property enhancers. The compositions and the properties obtained were as shown in Tables 9 and 10. From Tables 9 and 10 it is apparent that acid-amides derived from amines having 6 or less carbon atoms are preferred. While acid-amides prepared from amines having more than 6 carbon atoms appear to have little or no effect on physical properties, some improvement in the color of the resultant resin was noticed.

TABLE 8

| Amine | Polycarboxylic acid | Ratio of Amine/Acid | Reaction Product | Precipitate formation (A/B)[c] |
|---|---|---|---|---|
| Diethylamine | citric acid-1-hydrate | 1:1 | N,N'—diethyl citric acid amide | A |
| propylamine | citric acid-1-hydrate | 2:1 | N,N'—dipropyl citric acid amide | A |
| aniline[a] | citric acid-1-hydrate | 1:1 | N—phenyl citric acid amide | B |
| dodecylamine | citric acid-1-hydrate | 1:1 | N—dodecyl citric acid amide | B |
| dodecylamine | citric acid-1-hydrate[b] | 2:1 | N,N'—didodecyl citric acid amide | B |
| dodecylamine | d,1-malic acid[b] | 1:1 | N—dodecyl malic acid amide | B |

[a]Purified by vacuum distillation (Fisher Spalt Rohr system).
[b]Citric acid/malic acid dissolved at T = 55° C.; reaction also carried out at this temperature
[c]A-highly viscous slurry formed; B-precipitate formed.

TABLE 9

| Example | 26 | 27 | 28 | 29 | 30 |
|---|---|---|---|---|---|
| polyphenylene ether[a] | 50 | 50 | 50 | 50 | 50 |
| polyamide 6,6[b] | 50 | 50 | 50 | 50 | 50 |
| citric acid-1-hydrate | 0.7 | — | — | — | — |
| N—phenyl citric acid amide | — | 0.85 | — | — | — |
| N—dodecyl citric acid amide | — | — | 1.2 | — | — |
| N,N'—didodecyl citric acid amide | — | — | — | 1.84 | — |
| N,N'—diethyl citric acid amide | — | — | — | — | 0.825 |
| N,N'—dipropyl citric acid amide[c] | — | — | — | — | — |
| Unnotched Izod ft.lb./in. | >23.4 | >23.4 | 6.74 | 4.12 | >23.4 |
| Notched Izod ft.lb./in. | 1.09 | .94 | .64 | .67 | .81 |
| Tensile Yield Strength psi | 11063 | 11165 | 8845 | 7685 | 10875 |
| Tensile Elongation, % | 23 | 8.5 | 5 | 4.5 | 10 |

[a & b]See footnotes a & b, Table 3
[c]this acid amide was not tested

TABLE 10

| Example | H | 31 | 32 |
|---|---|---|---|
| polyphenylene ether[a] | 50 | 50 | 50 |
| polyamide 6,6[b] | 50 | 50 | 50 |
| malic acid | — | 0.5 | — |
| N—dodecyl malic acid amide | — | — | 0.5 |
| Unnotched Izod, ft.lb./in. | 11.05 | 16.57 | 7.06 |
| Notched Izod, ft.lb./in. | .75 | .94 | .70 |
| Tensile Yield Strength psi | 8076 | 10657 | 8642 |
| Tensile Elongation % | 7.75 | 19.5 | 8.0 |

[a&b]see Table 9

EXAMPLES 33–45

Two series of compositions were prepared in order to further demonstrate the breadth of the present invention. In these examples, various polyamides were evaluated alone and in combination with an additional modifier resin.

The specific formulations and the physical properties of these compositions were as shown in Table 11 and 12.

TABLE 11

| Example | I | 33 | J | 34 | K | 35 |
|---|---|---|---|---|---|---|
| polyphenylene ether[a] | 50 | 50 | 49 | 49 | 50 | 50 |
| polyamide 6[b] | 50 | 50 | 41 | 41 | — | — |
| polyamide 12[c] | — | — | — | — | 50 | 50 |
| citric acid (anhydrous) | — | 0.5 | — | 0.5 | — | 0.5 |
| SEBS[d] | — | — | 10 | 10 | — | — |
| Unnotched izod impact strength (ft.-lb./in.) | 2.7 | 5.9 | 7.0 | >38.0 | 3.7 | 4.3 |
| Tensile Elongation % | — | — | 4.1 | 37.0 | — | — |

[a] See footnote a Table 2
[b] from Nylon Corporation of America
[c] from Hules
[d] Styrene hydrogenated butadiene styrene triblock copolymer from Shell

TABLE 12

| Example | Polyamide | Amount | PPE[a] | CAH[b] | SEBS[c] | Notched Izod ft.lb./in. | Tensile Elongation % |
|---|---|---|---|---|---|---|---|
| L | polyamide 6,12 | 45 | 45 | — | 10 | 0.6 | 6 |
| 36 | polyamide 6,12 | 45 | 45 | 0.7 | 10 | 2.5 | 30 |
| M | polyamide 6/poly- | 45 | 45 | — | 10 | 1.2 | 10 |
| 37 | amide 6,6 copolymer | 45 | 45 | 0.7 | 10 | 4.1 | 30 |
| N | polyamide 12 | 45 | 45 | — | 10 | 0.3 | 4 |
| 38 | polyamide 12 | 45 | 45 | 0.6 | 10 | 0.9 | 14 |
| O | polyamide 6 | 45 | 45 | — | 10 | 0.3 | 4 |
| 39 | polyamide 6 | 45 | 45 | 0.6 | 10 | 2.4 | 30 |
| P | polyamide 6,6 | 45 | 45 | — | 10 | 0.6 | 5 |
| 40 | polyamide 6,6 | 45 | 45 | 0.6 | 10 | 3.1 | 38 |
| Q | polyamide 6,6 | 67.5 | 22.5 | — | 10 | 0.8 | 22 |
| 41 | polyamide 6,6 | 67.5 | 22.5 | 0.5 | 10 | 2.2 | 32 |
| R | polyamide 4,6 | 45 | 45 | — | 10 | 0.6 | 4 |
| 42 | polyamide 4,6 | 45 | 45 | 0.6 | 10 | 4.5 | 43 |
| S | polyamide 4,6 | 50 | 50 | — | — | 0.5 | 3 |
| 43 | polyamide 4,6 | 50 | 50 | 0.6 | — | 1.0 | 20 |
| T | polyamide 4,6 | 41 | 49 | — | 10 | 0.3 | 2 |
| 44 | polyamide 4,6 | 41 | 49 | 0.5 | 10 | 4.0 | 24 |
| U | polyamide 6,I | 41 | 49 | — | 10 | 0.5 | 4 |
| 45 | polyamide 6,I | 41 | 49 | 0.6 | 10 | 4.1 | 12 |

[a] see footnote a Table 1
[b] citric acid-1-hydrate
[c] Styrene-hydrogenated butadiene-styrene block copolymers

EXAMPLES 46–67

A series of examples were prepared in order to further demonstrate the breadth of the present invention as claimed. In this series of examples, various modifier resins known in the art to modify polyamides or polyphenylene ethers for improved physical properties, especially impact strength, and/or processability were demonstrated. The various modifier resins employed in these examples were as follows:

Surlyn 9910 and 1706—ionomer resins from E. I. duPont

Primacor 3440—ethylene-comonomer acid (heat stable EAA) from Dow Chemical

IM 7200—ethylene-propylene rubber/ethylene-propylene-diene monomer rubber from Uniroyal IM 7565—ethylene-propylene-diene monomer rubber/high density polyethylene from Uniroyal LDPE—low density polyethylene from U.S. Industrial Chemicals Stereon—styrene butadiene copolymer from Firestone Paracril—butadiene acrylonitrile copolymer from Uniroyal HIPS—high impact polystyrene from American Hoechst EPRgAA—acrylic acid grafted ethylene propylene rubber from Reichold PEgMA—maleic anhydride grafted polyethylene made in accordance with Swiger et al. U.S. Pat. No. 4,147,740 having 0.75 wt. percent anhydride.

CXA E136—modified ethylene vinyl acetate from E. I. duPont

EPDMgGMA—glycidyl methacrylate grafted EPDM rubber from Copolymers Rubber and Chemical Corp.

The specific compositions of each example and the physical properties thereof were as shown in Table 13.

TABLE 13

| Example | Modifier Resin | Amt. | PPE[a] | PA6,6[b] | SEBS[c] | CA[d] | Notched Izod ft.lb./in. | Tensile Elongation % |
|---|---|---|---|---|---|---|---|---|
| 46 | Surlyn 1706 | 5 | 49 | 41 | 5 | 0.6 | 0.7 | 29 |
| 47 | Surlyn 9910 | 5 | 49 | 41 | 5 | 0.5 | 2.1 | 22 |
| 48 | Primacor 3440 | 5 | 49 | 41 | 5 | 0.5 | 1.6 | 19 |
| 49 | Primacor 3440 | 10 | 36 | 54 | 10 | 0.5 | 1.1 | 15 |
| 50 | IM 7200 | 10 | 49 | 41 | — | 0.5 | 1.0 | 16 |
| 51 | IM 7565 | 10 | 49 | 41 | — | 0.5 | 2.0 | 22 |
| 52 | LDPE | 10 | 49 | 41 | — | 0.5 | 1.5 | 14 |
| V | Stereon | 10 | 49 | 41 | — | — | 0.2 | 4 |
| 53 | Stereon | 10 | 49 | 41 | — | 0.5 | 1.9 | 46 |
| 54 | Paracril | 10 | 49 | 41 | — | 0.5 | 0.8 | 15 |
| 55 | HIPS | 9 | 42 | 40 | 9 | 0.5 | 2.0 | 22 |
| 56 | HIPS | 10 | 49 | 41 | — | 0.5 | 0.8 | 14 |

TABLE 13-continued

| Example | Modifier Resin | Amt. | PPE[a] | PA6,6[b] | SEBS[c] | CA[d] | Notched Izod ft.lb./in. | Tensile Elongation % |
|---|---|---|---|---|---|---|---|---|
| 57 | HIPS | 15 | 44 | 41 | — | 0.5 | 0.8 | 9 |
| W | HIPS | 20 | 40 | 40 | — | — | 4.2 | 2.3 |
| 58 | HIPS | 20 | 40 | 40 | — | 0.5 | 8.6 | 3.4 |
| 59 | EPRgAA | 7 | 49 | 41 | 10 | 0.75 | 1.5 | 25 |
| X | PEgMA | 10 | 36 | 54 | 10 | — | 0.7 | 9 |
| 60 | PEgMA | 10 | 36 | 54 | 10 | 0.5 | 4.0 | 41 |
| 61 | PEgMA | 5 | 36 | 54 | 10 | 0.5 | 4.1 | 44 |
| 62 | PEgMA | 5 | 41 | 49 | 5 | 0.6 | 2.2 | 33 |
| 63 | PEgMA | 10 | 41 | 49 | 5 | 0.6 | 1.1 | 27 |
| 64 | PEgMA | 10 | 60 | 40 | 5 | 0.6 | 3.5 | 36 |
| 65 | CXA E136 | 10 | 36 | 54 | 10 | 0.5 | 2.6 | 38 |
| Y | EPDMgGMA | 10 | 45 | 45 | — | — | 0.7 | 4 |
| 66 | EPDMgGMA | 10 | 45 | 45 | — | 0.7 | 1.4 | 13 |
| 67 | EPDMgGMA | 5 | 45 | 45 | 5 | 0.7 | 2.6 | 26 |

[a] & [b] see footnotes a & b, Table 2
[c] see footnote d Table 7
[d] citric acid (anhydrous)

EXAMPLES 68-70

Several additional compositions were prepared demonstrating various embodiments of the present invention. Specifically, these examples demonstrate filled compositions, compositions prepared with combinations of polyamides and super tough polyamides. The specific compositions and the properties obtained were as shown in Table 14.

Examples 69 and 70 were prepared by precompounding the polyphenylene ether with citric acid and adding the super tough polyamide and glass fiber and polyamide, respectively, through an entry port to the extruder barrel downstream from the initial feed.

TABLE 14

| Example | 68 | Z | 69* | 70* |
|---|---|---|---|---|
| polyphenylene ether[a] | 49 | 49 | 50 | 30 |
| polyamide 6[b] | 22.5 | 22.5 | — | — |
| polyamide 6,6[c] | 22.5 | 22.5 | — | 40 |
| Zytel ST 801[d] | — | — | 50 | — |
| citric acid (anhydrous) | 0.5 | — | — | 0.5 |
| citric acid-1-hydrate | — | — | 0.75 | — |
| SEBS[e] | 10 | 10 | — | 1 |
| Glass fiber | — | — | — | 30 |
| Stabilizer[f] | — | — | — | 0.3 |
| Notched Izod ft.lb./in. | 3.5 | 0.2 | 3.75 | 1.7 |
| Tensile Elongation, % | 31 | 2 | 35.5 | 7.1 |
| Falling Dart ft.lb. | — | — | 31.7 | — |
| Tensile Yield Strength psi | — | — | 8076 | 21885 |

[a] see footnote a Table 2
[b]&[c] polyamides from duPont
[d] super tough, modified polyamide from duPont
[e] see footnote c Table 2
[f] stabilizer package containing hindered phenol antioxidant and potassium and cuprous salts as heat stabilizers
*Prepared by precompounding (see text)

EXAMPLES 71-79

Various polyphenylene ether-polyamide compositions were prepared in accordance with the improved process of the present invention. Specifically, examples within and outside the scope of the present invention were prepared by directly compounding all of the ingredients. Examples within the scope of the improved process of the present invention were prepared by precompounding the polycarboxylic acid, alone or in combination with an amine and/or modifier resin, and subsequently compounded with the polyamide. The specific formulations and the properties obtained with each are presented in Table 1.

Table 15 embodies various compositions within and beyond the scope of the present invention wherein malic acid comprises the polycarboxylic acid component. Comparative Example AA and Examples 71 and 72 demonstrates that while a high level of dibutylamine with malic acid reduces impact strength in the compatibilized composition the same composition wherein the malic acid and dibutylamine and polyphenylene ether are precompounded surprisingly enhances impact strength as well as elongation and tensile yield strength. Example 73 demonstrates precompounding of the polycarboxylic acid amine stabilizer and styrene-butadiene-styrene triblock copolymer with the polyphenylene ether before blending with polyamide.

Similarly, Table 16 demonstrates once again the utility and the improvement in precompounding citric acid alone or in combination with the modifier resin or modifer resin combination prior to compounding with the polyamide. The improvement is made clear by comparision of Comparative Examples CC with Examples 74 and 75 as well as comparison of Examples 77 through 79. In examples 75 and 76 the precompound compositions were fed into the extruder as ground particles or unground granules, respectively.

TABLE 15

| Example | AA | 71 | 72 | BB | 73 |
|---|---|---|---|---|---|
| polyphenylene ether[a] | 50 | 50 | — | 45 | — |
| polyamide 6,6[b] | — | — | — | 45 | 41 |
| polyamide 6,6[c] | 50 | 50 | 50 | — | — |
| d,1-malic acid | — | 1 | — | — | — |
| dibutylamine | — | 1 | — | — | — |
| SBS[d] | — | — | — | 10 | — |
| precompound A[e] | — | — | 51 | — | — |
| precompound B[f] | — | — | — | — | 61 |
| TiO$_2$ | — | — | — | — | 5 |
| Notched Izod ft.lb./in. | .64 | .58 | .88 | 1.09 | 2.4 |
| Falling Dart ft.lb. | — | — | — | 14 | 36.9 |
| Tensile Yield Strength × 10$^8$ psi | 10.6 | 10.2 | 11.0 | 7.5 | 9.7 |
| Tensile Elongation % | 6.5 | 6.0 | 23.5 | 9.2 | 16.5 |

[a,b,c] see footnote a,b,c, Table 3
[d] see footnote c Table 4
[e] precompounded composition of 100 pts. polyphenylene ether; 2 pts. d,1-malic acid; 1 pt. dibutylamine
[f] precompounded composition of 49 pts. polyphenylene ether; 10 pts. styrene-butadiene-styrene triblock copolymer; 1 pt. dibutylamine and 1 pt. d,1-malic acid

TABLE 16

| Example | CC | 74 | 75 | 76 | 77 | 78 | 79 |
|---|---|---|---|---|---|---|---|
| polyphenylene ether[a] | 50 | 49 | 24.5 | 24.5 | 9.5 | — | 39 |
| polyamide 6,6[b] | 50 | 41 | 41 | 41 | 41 | 41 | 41 |
| citric acid-1-hydrate | — | 0.7 | — | — | — | — | 0.7 |
| SBS[c] | — | 10 | 10 | 10 | 10 | — | 10 |
| HIPS[d] | — | — | — | — | — | — | 10 |
| precompound C[e] | — | — | 24.5* | 24.5** | — | — | — |
| precompound D[f] | — | — | — | — | 39.5 | — | — |
| precompound E[g] | — | — | — | — | — | 61 | — |
| stabilizer | — | — | — | — | — | — | 0.3 |
| Notched Izod, ft.lb./in. | .69 | 2.9 | 4.5 | 3.4 | 4.2 | 3.4 | .56 |
| Falling Dart ft.lb. | — | 100 | 145 | 155 | 144 | 59.7 | — |
| Tensile Yield Strength psi | 7815 | 8395 | 8743 | 7641 | 8511 | 9367 | 8134 |
| Tensile Elongation % | 5.5 | 78 | 45 | 74 | 39 | 24 | 11 |

[a,b,c]see respective footnotes Table 4
[d]high impact polystyrene (rubber modified polystyrene)
[e]precompound composition composed of 100 pts. polyphenylene ether, 1 pt. citric acid-1-hydrate and 1 pt. DPK (liquid phosphate)
[f]precompound composition composed of 75 pts. polyphenylene ether, 25 pts. HIPS, and 1 pt. citric acid-1-hydrate
[g]precompound composition composed of 37 pts. polyphenylene ether, 12 pts. HIPS, 10 pts. SBS and 1 pt. citric acid-1-hydrate
*ground
**granules Obviously, other modifications and variations of the present invention are possible in light of the above teachings. It is therefore to be understood that changes may be made in the particular embodiments of the invention described which are within the full intended scope of the invention so defined by the appended claims.

We claim:

1. An improved process for the preparation of polyphenylene ether-polyamide compositions wherein the improvement comprises precompounding from about 0.05 to about 4% by weight, based on the total composition, of one or more aliphatic polycarboxylic acid represented by the formula:

$$(R^IO)_mR(COOR^{II})_n(CONR^{III}R^{IV})_s$$

or derivatives thereof wherein R is a linear or branched chain, saturated aliphatic hydrocarbon of from 2 to 20 carbon atoms; $R^I$ is selected from the group consisting of hydrogen or an alkyl, aryl, acyl or carbonyl dioxy group of from 1 to 10 carbon atoms; each $R^{II}$ is independently selected from the group consisting of hydrogen or an alkyl or aryl group of from 1 to 20 carbon atoms; each $R^{III}$ and $R^{IV}$ is independently selected from the group consisting of hydrogen or an alkyl or aryl group of from 1 to 10 carbon atoms; m is equal to 1 and (n+s) is greater than or equal to 2, and n and s are each greater than or equal to 0; and wherein $(OR^I)$ is alpha or beta to a carbonyl group and at least 2 carbonyl groups are separated by 2 to 6 carbon atoms, with the polyphenylene ether and a modifier resin prior to compounding with the polyamide in order to enhance the impact strength of the final composition; said modifier resin having been derived from vinyl aromatic monomers, the blending ratio of polyphenylene ether to polyamide being from 5 to 95 percent by weight of the former to 95 to 5 percent by weight of the latter.

2. The process of claim 1 wherein the polycarboxylic acid is represented by the formula:

$$(R^IO)_mR(COOR^{II})_n(CONR^{III}R^{IV})_s$$

or derivative thereof wherein R is a linear or branched chain, saturated aliphatic hydrocarbon of from 2 to 10 carbon atoms; $R^I$ is selected from the group consisting of hydrogen or an alkyl, aryl, acyl or carbonyl dioxy group of from 1 to 6 carbon atoms; each $R^{II}$ is independently selected from the group consisting of hydrogen or an alkyl or aryl group of from 1 to 10 carbon atoms; each $R^{III}$ and $R^{IV}$ is independently selected from the group consisting essentially of hydrogen or an alkyl or aryl group of from 1 to 6 carbon atoms; m is equal to 1 and (n+s) is equal to 2 or 3, and n and s are each greater than or equal to 0 and wherein $(OR^I)$ is alpha to the carbonyl group.

3. The process of claim 1 wherein the polycarboxylic acid is represented by the formula:

$$(R^IO)_mR(COOR^{II})_n$$

or derivative thereof wherein R is a linear or branched saturated aliphatic hydrocarbon of 2 to 10 carbon atoms, $R^I$ is selected from the group consisting of hydrogen or an alkyl, acyl or carbonyldioxy group of from 1 to 6 carbon atoms, $R^{II}$ is selected from the group consisting of hydrogen or an alkyl group of from 1 to 20 carbon atoms; m is equal to 1 and n is equal to 2 or 3 and wherein $(OR^I)$ is alpha to the carbonyl group.

4. The process of claim 1 wherein the polycarboxylic acid is selected from the group consisting essentially of citric acid, malic acid and salts thereof.

5. The process of claim 1 wherein the amount of polycarboxylic acid employed is from about 0.1 to about 2% by weight based on the weight of the total composition.

6. The process of claim 1 wherein the ratio of polyphenylene ether to polyamide is from 30 to 70% by weight of the former to 70 to 30% by weight of the latter.

7. The process of claim 1 wherein the polyphenylene ether is a homoplymer or a copolymer having units with the repeating structural formula:

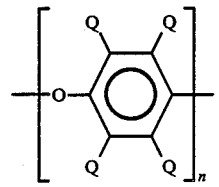

wherein the oxygen ether atom of one unit is connected to the benzene nucleus of the next joining unit, and n is a positive integer and is at least 50, and each Q is independently a monovalent substituent selected from a group consisting of hydrogen, halogen, hydrocarbon and hydrocarbonoxy groups free of a tertiary alpha-carbon atom and halohydrocarbon and halohydrocarbonoxy groups free of a tertiary alpha-carbon atom and having at least 2 carbon atoms between the halogen atom and the phenyl nucleus.

8. The process of claim 1 wherein the polyphenylene ether is poly(2,6 dimethyl-1,4-phenylene)ether.

9. The process of claim 1 wherein the polyamide is selected from the group consisting of polyamide 6; polyamide 6,6; polyamide 12 and polyamide 6/10.

10. The process of claim 1 wherein the polyamide is polyamide 6/6.

11. The process of claim 1 which further comprises admixing therewith up to 3% by weight of a primary or secondary amine.

12. The process of claim 11 wherein the amine is precompounded with the polyphenylene ether and the polycarboxylic acid.

13. The process of claim 11 wherein the amine is prereacted with the polycarboxylic acid prior to precompounding.

14. An improved process for the preparation of polyphenylene ether-polyamide compositions wherein the improvement comprises precompounding one or more aliphatic polycarboxylic acid represented by the formula:

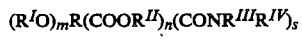

or derivatives thereof wherein R is a linear of branched chain, saturated aliphatic hydrocarbon of from 2 to 20 carbon atoms; $R^I$ is selected from the group consisting of hydrogen or an alkyl, aryl, acyl or carbonyl dioxy group of from 1 to 10 carbon atoms; each $R^{II}$ is independently selected from the group consisting of hydrogen or an alkyl or aryl group of from 1 to 20 carbon atoms; each $R^{III}$ and $R^{IV}$ is independently selected from the group consisting of hydrogen or an alkyl or aryl group of from 1 to 10 carbon atoms; m is equal to 1 and (n+s) is greater than or equal to 2, and n and s are each greater than or equal to 0; and wherein $(OR^I)$ is alpha or beta to a carbonyl group and at least 2 carbonyl groups are separated by 2 to 6 carbon atoms in an amount sufficient to enhance the impact strength of the polyphenylene ether-polyamide composition, with the polyphenylene ether and a modifier resin prior to compounding with the polyamide, said modifier resin having been derived from vinyl aromatic monomers, the blending ratio of polyphenylene ether to polyamide being from 5 to 95 percent by weight of the former to 95 to 5 percent by weight of the latter.

15. A process for the preparation of polyphenylene ether-polyamide compositions, said composition being derived from citric acid, a polyphenylene ether, a modifier resin and a polyamide, said process comprising precompounding said citric acid with said polyphenylene ether and said modifier resin prior to compounding with said polyamide, said modifier resin being selected from the group consisting of polymer resins derived from vinyl aromatic monomers, the blending ratio of polyphenylene ether to polyamide being from 5 to 95 percent by weight of the former to 95 to 5 percent by weight of the latter.

16. The process of claim 15, wherein said polyamide is polyamide 6,6.

17. The process of claim 15, wherein said polyphenylene ether is poly(2,6 dimethyl-1,4-phenylene)ether.

18. The process of claim 15 wherein said modifier resin is selected from the group consisting of
polystyrene-polybutadiene;
polystyrene-polyisoprene;
poly(alpha-methylstyrene)-polybutadiene;
polystyrene-polybutadiene-polystyrene;
polystyrene-polyisoprene-polystyrene;
poly(alpha-methylstyrene)-polybutadiene-poly-(alpha-methylstyrene); and
poly(alpha-methylstyrene)-polyisoprene-poly-(alpha-methystyrene).

19. A process for the preparation of polyphenylene ether-polyamide composition, said composition being derived from citric acid, a polyphenylene ether, a modifier resin and a polyamide, said process comprising precompounding said citric acid with said polyphenylene ether and said modifier resin prior to compounding with said polyamide, said polyphenylene ether being poly(2,6 dimethyl-1,4-phenylene)-ether, said modifier resin being polystyrene-polybutadiene-polystyrene triblock copolymer, said polyamide being polyamide 6,6, the blending ratio of polyphenylene ether to polyamide being from 5 to 95 percent by weight of the former to 95 to 5 percent by weight of the latter.

20. A process for the preparation of polyphenylene ether-polyamide composition, said composition being derived from citric acid, a polyphenylene ether, a modifier resin and a polyamide, said process comprising precompounding said citric acid with said polyphenylene ether and said modifier resin prior to compounding with said polyamide, said polyphenylene ether being poly(2,6 dimethyl-1,4-phenylene)ether, said modifier resin being polystyrene-polybutadiene-polystyrene triblock copolymer, said polyamide being polyamide 6,6, wherein said polyphenylene ether is present at a level of about 45 percent by weight of said composition, said polyamide is present at a level of about 45 percent by weight of said composition, and said citric acid is present at a level of about 0.7 percent by weight of said composition.

21. A process for the preparation of a composition derived from melt blending polyphenylene ether resin, polyamide resin, citric acid and a modifier resin derived from vinyl aromatic monomers, the blending ratio of polyphenylene ether to polyamide being 5 to 95 percent by weight of the former to 95 to 5 percent by weight of the latter, the citric acid being present at a level of from 0.05 to 4 percent by weight based on the total composition, said modifier resin being present at a level of from 5 to 50 parts by weight based on 100 parts by weight of the combined weight of polyphenylene ether and polyamide, said process comprising:
(a) precompounding the citric acid with polyphenylene ether;
(b) compounding polyamide with the precompounded citric acid/polyphenylene ether.

22. The process of claim 21 wherein said citric acid is a citric acid ester.

23. The process of claim 21 wherein said modifier resin is a styrene-butadiene-styrene triblock copolymer.

24. The process of claim 21 wherein the blending ratio of polyphenylene ether to polyamide is 30 to 70 percent by weight of the former to 70 to 30 percent by weight of the latter.

* * * * *